United States Patent
Murai et al.

(10) Patent No.: US 10,023,060 B2
(45) Date of Patent: Jul. 17, 2018

(54) AUTOMATIC POWER SUPPLY SYSTEM, AUTOMATIC POWER SUPPLY DEVICE, AND AUTONOMOUS MOVING SYSTEM

(71) Applicant: Panasonic Intellectual Property Management Co., Ltd., Osaka (JP)

(72) Inventors: Ryosuke Murai, Osaka (JP); Shintaro Kinoshita, Nara (JP); Hiroyuki Uematsu, Osaka (JP); Tatsuo Sakai, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/549,665

(22) PCT Filed: Feb. 24, 2016

(86) PCT No.: PCT/JP2016/000973
§ 371 (c)(1),
(2) Date: Aug. 9, 2017

(87) PCT Pub. No.: WO2016/147571
PCT Pub. Date: Sep. 22, 2016

(65) Prior Publication Data
US 2018/0029487 A1     Feb. 1, 2018

(30) Foreign Application Priority Data
Mar. 13, 2015    (JP) ................. 2015-050843

(51) Int. Cl.
*G05D 1/02* (2006.01)
*B60L 11/18* (2006.01)

(52) U.S. Cl.
CPC ........ *B60L 11/1833* (2013.01); *G05D 1/0212* (2013.01)

(58) Field of Classification Search
CPC . B60L 11/1833; B60L 11/1824; G05D 1/0212
See application file for complete search history.

(56) References Cited

U.S. PATENT DOCUMENTS

| 4,944,357 A | 7/1990 | Wible et al. |
| 5,523,666 A | 6/1996 | Hoelzl et al. |

(Continued)

FOREIGN PATENT DOCUMENTS

| JP | 3-003618 | 1/1991 |
| JP | 5-015073 | 1/1993 |

(Continued)

OTHER PUBLICATIONS

International Search Report of PCT application No. PCT/JP2016/000973 dated May 10, 2016.

*Primary Examiner* — Michael J Zanelli
(74) *Attorney, Agent, or Firm* — Wenderoth, Lind & Ponack, L.L.P (57) ABSTRACT

Provided is an automatic power supply device which enables to perform an automatic power supply with a simple configuration, with respect to a moving body. The automatic power supply device that includes a terminal for a power supply, and supplies power to a rechargeable battery which is placed in the moving body through a power receiver which is disposed in the moving body, the automatic power supply device includes a mechanism that drives a power supplier including the power supply terminal, and a mechanism that automatically charges the moving body. The automatic power supply device includes a cavity in a portion of a housing shape of the automatic power supply device, in a measurement area of an environment recognition sensor which is included in the moving body.

5 Claims, 10 Drawing Sheets

(56) References Cited

U.S. PATENT DOCUMENTS

| | | | | |
|---|---|---|---|---|
| 8,749,196 B2* | 6/2014 | Cohen | ................... | A47L 9/2857 |
| | | | | 320/109 |
| 2009/0315501 A1 | 12/2009 | Li et al. | | |
| 2014/0217977 A1 | 8/2014 | Pastoor et al. | | |
| 2015/0151765 A1* | 6/2015 | Taira | ..................... | B60W 40/06 |
| | | | | 701/22 |

FOREIGN PATENT DOCUMENTS

| | | |
|---|---|---|
| JP | 10-336806 | 12/1998 |
| JP | 2006-081310 | 3/2006 |
| JP | 2006-345588 | 12/2006 |
| JP | 2009-015611 | 1/2009 |
| JP | 2009-238055 | 10/2009 |

* cited by examiner

AUTOMATIC POWER SUPPLY SYSTEM, AUTOMATIC POWER SUPPLY DEVICE, AND AUTONOMOUS MOVING SYSTEM

This application is a U.S. national stage application of the PCT International Application No. PCT/JP2016/000973 filed on Feb. 24, 2016, which claims the benefit of foreign priority of Japanese patent application 2015-050843 filed on Mar. 13, 2015, the contents all of which are incorporated herein by reference.

TECHNICAL FIELD

The present invention relates to an automatic power supply system that supplies power to a moving body, an automatic power supply device, and an autonomous moving system.

BACKGROUND ART

In the related art, an automatic power supply device for supplying power to a moving body such as an automobile or an autonomous moving device has been developed (for example, see PTL 1).

Figure 12:
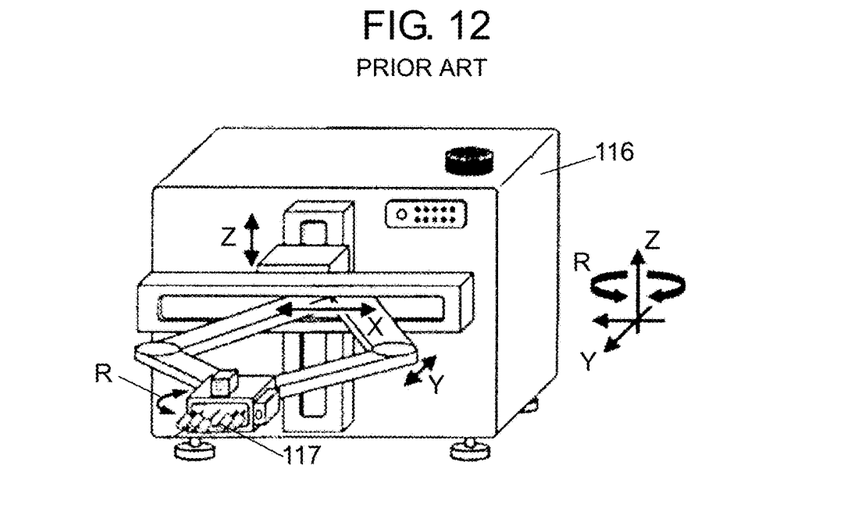
FIG. 12 is a diagram illustrating an automatic power supply device of the related art.

FIG. 12 is a diagram illustrating an automatic power supply device of the related art. Since automatic power supply device 116 of the related art charges a moving body that is stopped at a distant position, automatic power supply device 116 includes a mechanism that carries out position correction for the purpose of realizing a contact between a power supply terminal and power receiving terminal 117 within a predetermined position error range.

CITATION LIST

Patent Literature

PTL 1: Japanese Patent Unexamined Publication No. 2006-081310

SUMMARY OF THE INVENTION

However, in the related art, in a case where the moving body is stopped in a state of being separated from the automatic power supply device, there are problems that a need to move a power supplier as a long distance is generated, and a drive mechanism of the power supplier becomes complicated.

Meanwhile, the moving body which is represented by an autonomous moving device, generally has a stop area in the vicinity of the autonomous moving device, in order to avoid collision with an obstacle. The autonomous moving device is stopped if the obstacle is detected in the stop area, and it is not possible to restart the autonomous moving device in a state where the obstacle is detected in the stop area. Therefore, in the moving body of the related art, the moving body is less likely to approach the automatic power supply device.

The present disclosure solves the above problems relating to the related art, and provides an automatic power supply device and an autonomous moving system that enable to realize an approach of the moving body to the automatic power supply device, can make a drive unit of the automatic power supply device have a simple configuration, and enable to more effectively use a space during a power supply.

In order to solve the above problems, according to the present disclosure, there is provided an automatic power supply device that includes a terminal for a power supply, and supplies power to a battery which is placed in a moving body through a power receiver which is disposed in the moving body, the automatic power supply device including a drive mechanism that drives a power supplier including the terminal for a power supply, in which a cavity unit is included in a portion of a housing that forms the automatic power supply device.

According to the automatic power supply device of the present invention, it is possible to realize an approach of the moving body to the automatic power supply device, it is possible to make a drive unit of the automatic power supply device have a simple configuration, and it is possible to more effectively use a space during a power supply.

DESCRIPTION OF EMBODIMENTS

Hereinafter, an automatic power supply system, an automatic power supply device, and an autonomous moving system according to exemplary embodiments of the present disclosure will be described with reference to the drawings.

First Exemplary Embodiment

Figure 1:
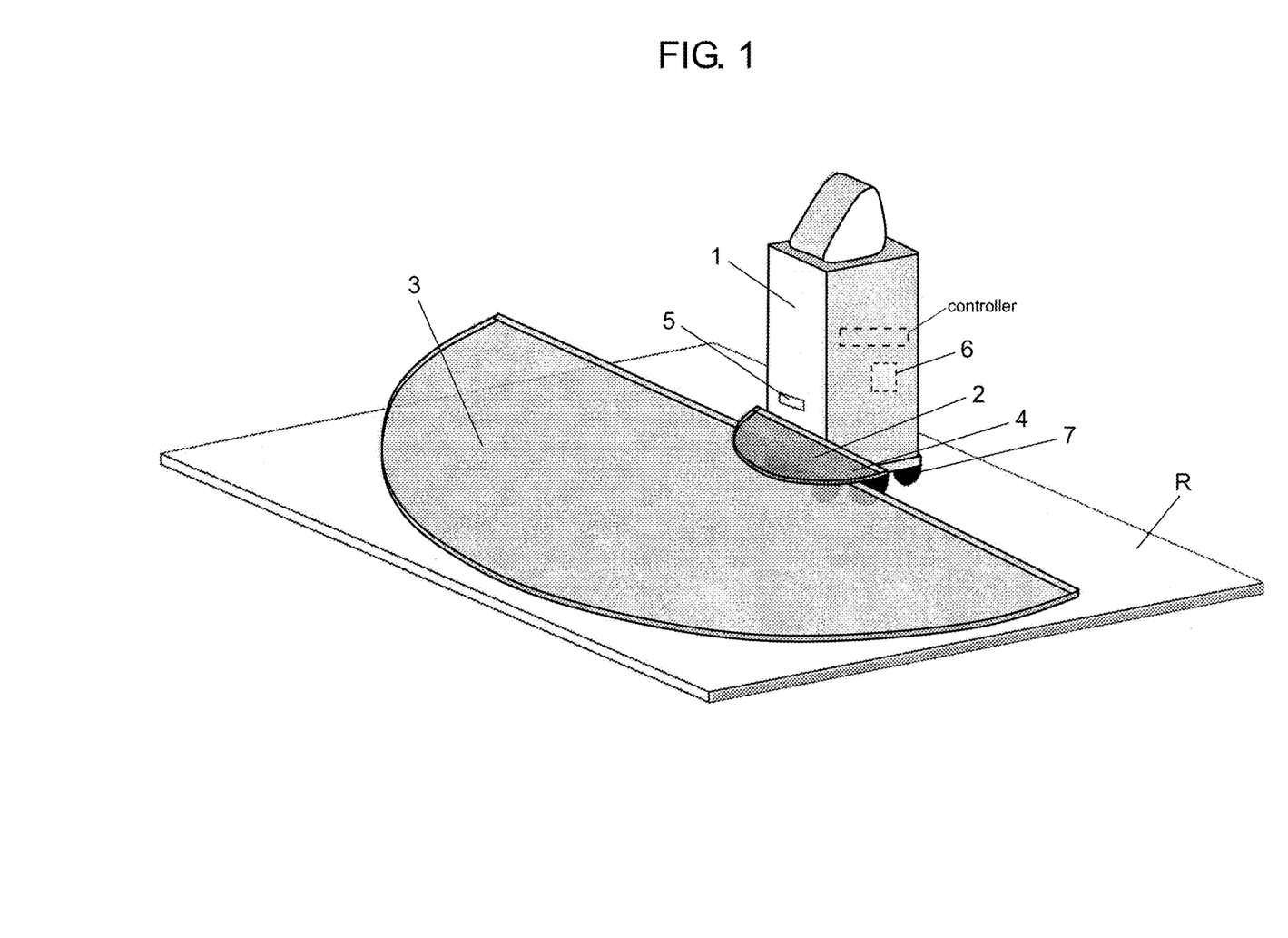
FIG. 1 is a perspective view illustrating a configuration of an autonomous moving device according to a first exemplary embodiment of the present disclosure.

A configuration of autonomous moving device 1 according to a first exemplary embodiment of the present disclosure, is illustrated in a perspective view of FIG. 1. As illustrated in FIG. 1, autonomous moving device 1 includes environment information obtaining sensor 2, power receiver 5, rechargeable battery 6, and moving means 7.

Environment information obtaining sensor 2 obtains position information of an obstacle which is present in a peripheral space of autonomous moving device 1. In rechargeable battery 6, autonomous moving device 1 is driven by power which is supplied from rechargeable battery 6. Power receiver 5 obtains the power from automatic power supply device 11 illustrated in FIG. 3A and subsequent drawings, and supplies the power to rechargeable battery 6. For example, moving means 7 is formed of wheels. Autonomous moving device 1 according to the exemplary embodiment, is an example of a moving body.

More specifically, as illustrated in FIG. 1, environment information obtaining sensor 2 obtains the information of measurement plane 3, which is in a plane substantially parallel to running surface R.

In environment information obtaining sensor 2, for example, a laser radar that scans a horizontal plane can be used. The laser radar is a distance sensor that obtains a distance to an object or an obstacle, in a forward semicircle-shaped obstacle detection area having a predetermined radius, by scanning a laser beam at a predetermined angle in a predetermined plane. For example, the laser radar performs distance measurement per 0.5° in a range which is a measurement distance of 30 m, and ±90° of left and right sides in an advancing direction. For example, environment information obtaining sensor 2 intermittently performs scanning based on a fixed control period, and stores a set of distance data which is obtained per scanning of one time, as environment information (sensor information) in a storage unit (not illustrated) at each time point.

Figure 2:
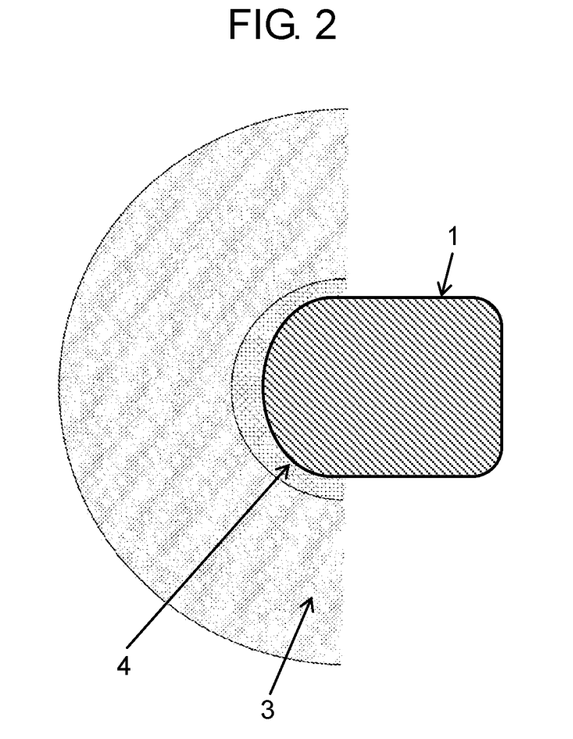
FIG. 2 is a diagram illustrating a relationship between a disposition of the autonomous moving device according to the first exemplary embodiment of the present disclosure and measurement plane 3 of an environment information obtaining sensor.

FIG. 2 is a diagram illustrating a relationship between a disposition of autonomous moving device 1 and measurement plane 3 of environment information obtaining sensor 2, and is a diagram which is obtained by viewing autonomous moving device 1 from above. As illustrated in FIG. 2, with respect to autonomous moving device 1, safety stop area 4 is set as an area for safely stopping autonomous moving device 1, in a portion of measurement plane 3 of environment information obtaining sensor 2. For example, safety stop area 4 is set to 5 cm in the vicinity, from an outer periphery in the advancing direction of autonomous moving device 1. By performing the setting in this manner, in a case where the obstacle is detected in the area, autonomous moving device 1 may be stopped, and it is possible to prevent a contact with the obstacle.

The configuration of the sensor and the example of the sensor described above are merely examples that realize the exemplary embodiment, and are not limited thereto, and it is possible to use various sensors.

Figure 3A:
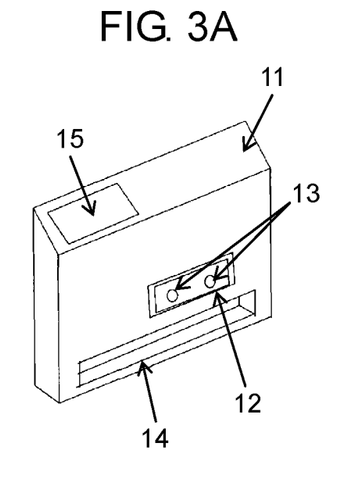
FIG. 3A is a perspective view illustrating a state where power supplier 12 is stored within a housing of automatic power supply device 11, in an automatic power supply device according to the first exemplary embodiment of the present disclosure.
Figure 3B:
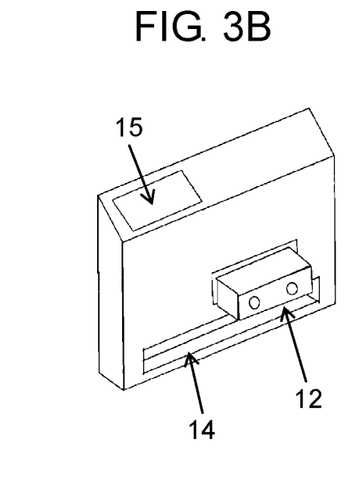
FIG. 3B is a perspective view illustrating a state where power supplier 12 is out of the housing of automatic power supply device 11, in the automatic power supply device according to the first exemplary embodiment of the present disclosure.

Next, automatic power supply device 11 will be described by using FIG. 3A and FIG. 3B. FIG. 3A and FIG. 3B are perspective views of automatic power supply device 11. FIG. 3A illustrates a state where power supplier 12 is stored within a housing of automatic power supply device 11, and FIG. 3B illustrates a state where power supplier 12 is out of the housing, in order to supply the power to autonomous moving device 1.

Automatic power supply device 11 rectifies a power source which is supplied from the power source, and supplies the power to autonomous moving device 1 through power supplier 12. Power supplier 12 may be driven in a front direction and a rear direction, and has power supply terminal 13 for supplying the power. Power supplier 12 is stored in the housing in a standby state (FIG. 3A), and comes into contact with power receiver 5 of autonomous moving device 1, by being moved to the outside from the housing at the time of the power supply (FIG. 3B).

Automatic power supply device 11 obtains timing of a charging start, and timing of a charging end, though communication. For example, the communication may be directly performed between autonomous moving device 1 and automatic power supply device 11 by using optical communication, and for example, the communication may be a command from a central monitoring unit (controller) that collectively controls autonomous moving device 1 and automatic power supply device 11.

As illustrated in FIG. 3A and FIG. 3B, automatic power supply device 11 includes cavity unit 14 in a portion of the housing, and display unit 15. Cavity unit 14 is provided at a position having the same height as measurement plane 3 of autonomous moving device 1, and it is possible to use a rectangular shape as a simple shape.

Next, an automatic power supply system according to the exemplary embodiment will be described, by using FIG. 4A and FIG. 4B. In particular, a position relationship between cavity unit 14 of automatic power supply device 11 and safety stop area 4 of autonomous moving device 1, and a position relationship between automatic power supply device 11 and autonomous moving device 1 will be described.

Figure 4A:
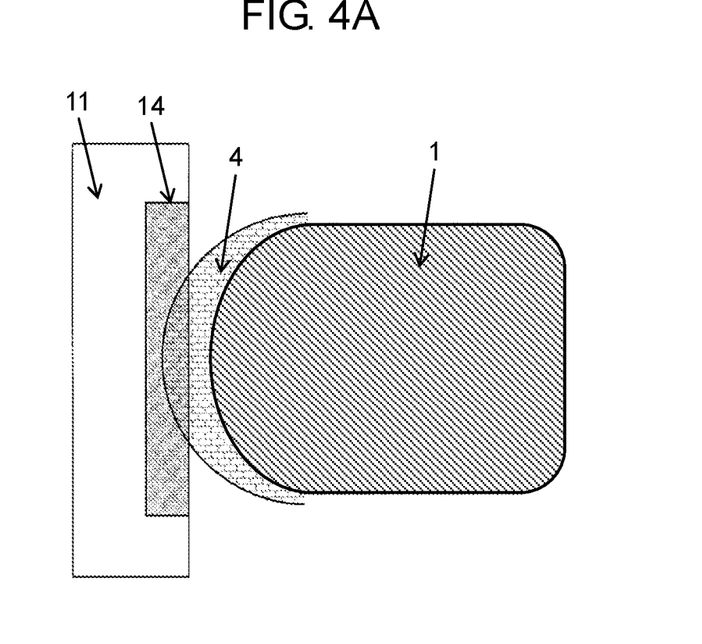
FIG. 4A is a diagram which is obtained by viewing a state thereof from above, when the autonomous moving device is stopped at a power supply position ahead of the automatic power supply device, with respect to an automatic power supply system according to the first exemplary embodiment of the present disclosure.

FIG. 4A is a diagram which is obtained by viewing a state thereof from above, when autonomous moving device 1 is stopped at a power supply position ahead of automatic power supply device 11. FIG. 4B is a diagram which is obtained by viewing a state thereof from a side, when autonomous moving device 1 is stopped at the power supply position ahead of automatic power supply device 11.

Figure 4B:
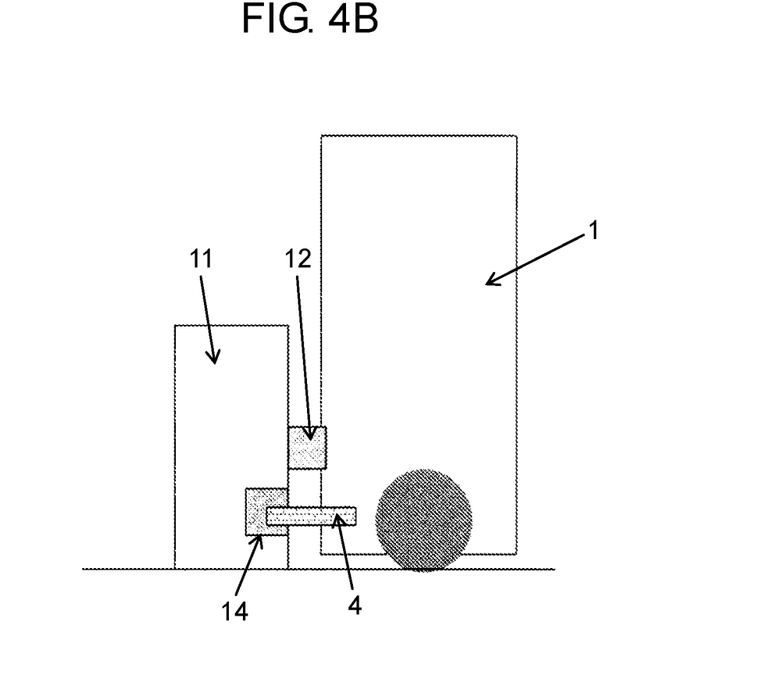
FIG. 4B is a diagram which is obtained by viewing a state thereof from a side, when the autonomous moving device is stopped at the power supply position ahead of the automatic power supply device, with respect to the automatic power supply system according to the first exemplary embodiment of the present disclosure.

As illustrated in FIG. 4A and FIG. 4B, autonomous moving device 1 is stopped ahead of automatic power supply device 11, so as not to be in contact with automatic power supply device 11, and safety stop area 4 enters into cavity unit 14, but is not in contact with automatic power supply device 11.

By the making in this manner, the autonomous moving device is not in contact with the automatic power supply device, ahead of automatic power supply device 11, and it is possible to prevent the autonomous moving device from stopping by detecting automatic power supply device 11 in the safety stop area. As described above, since autonomous moving device 1 may approach and may be stopped by automatic power supply device 11, it is possible to reduce a drive distance of power supplier 12, as power supplier 12 illustrated in FIG. 4B.

Figure 5:
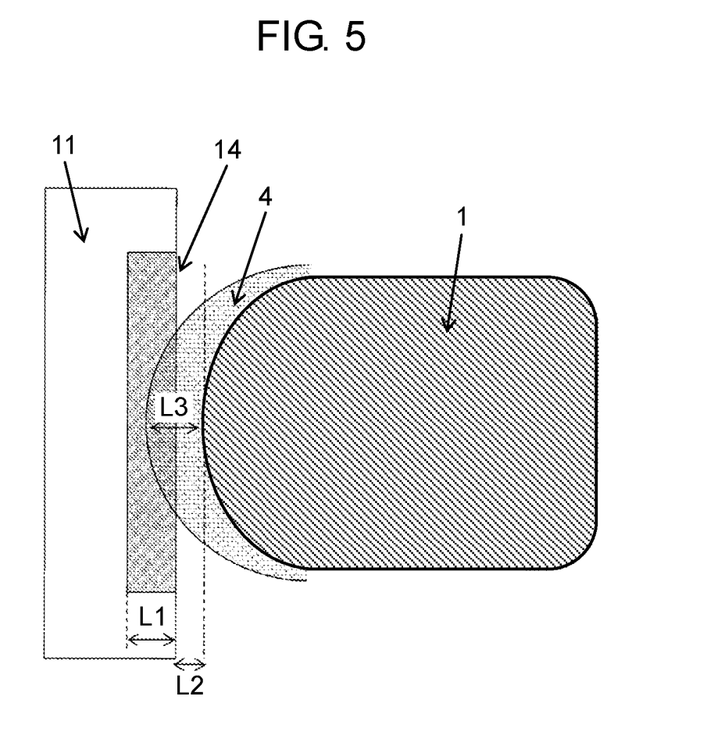
FIG. 5 is a diagram which is obtained by viewing a state where the autonomous moving device according to the first exemplary embodiment of the present disclosure is stopped for an automatic power supply ahead of the automatic power supply device from above.

Next, the position relationship between autonomous moving device 1 and automatic power supply device 11 will be described in more detail, by using FIG. 5. FIG. 5 is a diagram which is obtained by viewing a state where autonomous moving device 1 is stopped for an automatic power supply ahead of automatic power supply device 11 from above.

In FIG. 5, L1 indicates a depth of cavity unit 14, and L2 indicates a distance between autonomous moving device 1 and automatic power supply device 11 when autonomous moving device 1 arrives ahead of automatic power supply device 11, and L3 indicates a distance (range of safety stop area 4) which is from a tip of autonomous moving device 1 to a tip of safety stop area 4. In L1, L2, and L3, there is a need that the following conditions are satisfied, in order to stop autonomous moving device 1 without the contact ahead of automatic power supply device 11.

$$L3 < L1 + L2$$

In order to satisfy the condition, for example, it is possible to set L1, L2, and L3 as follows.

L1: 5 cm
L2: 5 cm
L3: 8 cm

In the related art, in a situation where cavity unit 14 is not present (which is the same meaning of L1=0), in order to stop autonomous moving device 1 without the contact ahead of automatic power supply device 11 in a state where L3 is fixed, for example, there are needs that L2 becomes 10 cm, and autonomous moving device 1 is stopped on the outside of safety stop area 4 from automatic power supply device 11. On the other hand, in the invention according to the present disclosure, autonomous moving device 1 is stopped on the inside of safety stop area 4 from automatic power supply device 11.

Next, an operation flow at the time of an automatic charging will be described, by using FIG. 6A to FIG. 6F.

Figure 6A:
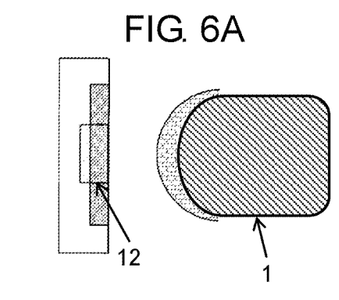
FIG. 6A is a diagram which is obtained by viewing a connection between the autonomous moving device and the automatic power supply device according to the first exemplary embodiment of the present disclosure from above, and is a diagram illustrating a state when the autonomous moving device approaches the automatic power supply device.
Figure 6B:
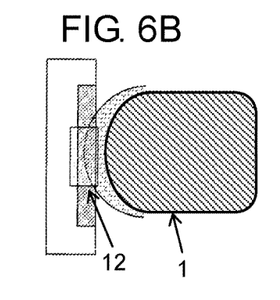
FIG. 6B is a diagram which is obtained by viewing the connection between the autonomous moving device and the automatic power supply device according to the first exemplary embodiment of the present disclosure from above, and is a diagram illustrating a state when the autonomous moving device arrives ahead of the automatic power supply device.
Figure 6C:
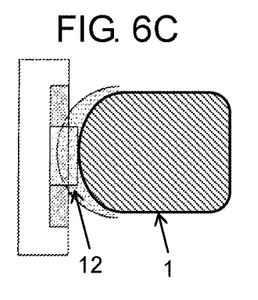
FIG. 6C is a diagram which is obtained by viewing the connection between the autonomous moving device and the automatic power supply device according to the first exemplary embodiment of the present disclosure from above, and is a diagram illustrating a state when an automatic charging is carried out by pressing a power supplier against the autonomous moving device by a drive unit of the automatic power supply device.
Figure 6D:
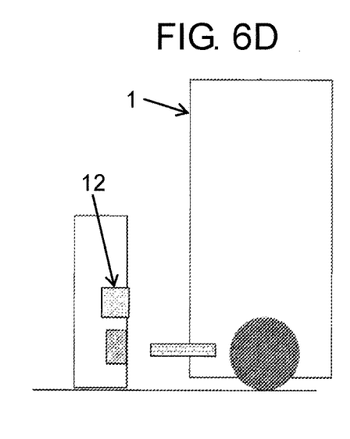
FIG. 6D is a diagram which is obtained by viewing the connection between the autonomous moving device and the automatic power supply device according to the first exemplary embodiment of the present disclosure from the side, and is a diagram illustrating the state when the autonomous moving device approaches the automatic power supply device.
Figure 6E:
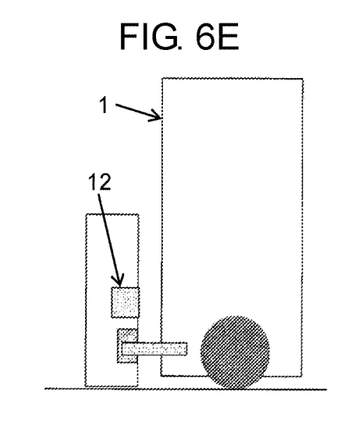
FIG. 6E is a diagram which is obtained by viewing the connection between the autonomous moving device and the automatic power supply device according to the first exemplary embodiment of the present disclosure from the side, and is a diagram illustrating the state when the autonomous moving device arrives ahead of the automatic power supply device.
Figure 6F:
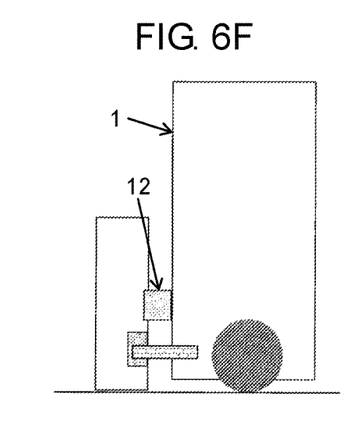
FIG. 6F is a diagram which is obtained by viewing the connection between the autonomous moving device and the automatic power supply device according to the first exemplary embodiment of the present disclosure from the side, and is a diagram illustrating the state when the automatic charging is carried out by pressing the power supplier against the autonomous moving device by the drive unit of the automatic power supply device.

FIG. 6A to FIG. 6C are diagrams which are obtained by viewing a connection between autonomous moving device 1 and automatic power supply device 11 from above, and FIG. 6D to FIG. 6F are diagrams which are obtained by viewing the connection from the side. FIG. 6A and FIG. 6D are diagrams illustrating a state when autonomous moving device 1 approaches automatic power supply device 11. FIG. 6B and FIG. 6E are diagrams illustrating a state when autonomous moving device 1 arrives ahead of automatic power supply device 11. FIG. 6C and FIG. 6F are diagrams illustrating a state when the automatic charging is carried out by pressing power supplier 12 against autonomous moving device 1 by a drive unit of automatic power supply device 11. In FIG. 6A to FIG. 6F, an autonomous moving system of autonomous moving device 1 is also illustrated.

In FIG. 6A and FIG. 6D, illustrated is a state where autonomous moving device 1 is moved towards a stop position ahead of automatic power supply device 11 while moving autonomous moving device 1 itself autonomously. Autonomous moving device 1 has a function of correcting an own position of autonomous moving device 1, by matching sensor data which is obtained by environment information obtaining sensor 2 with map information, in order to correct the own position thereof. Autonomous moving device 1 may correct the own position thereof, by using the shape of automatic power supply device 11, ahead of automatic power supply device 11.

Figure 7A:
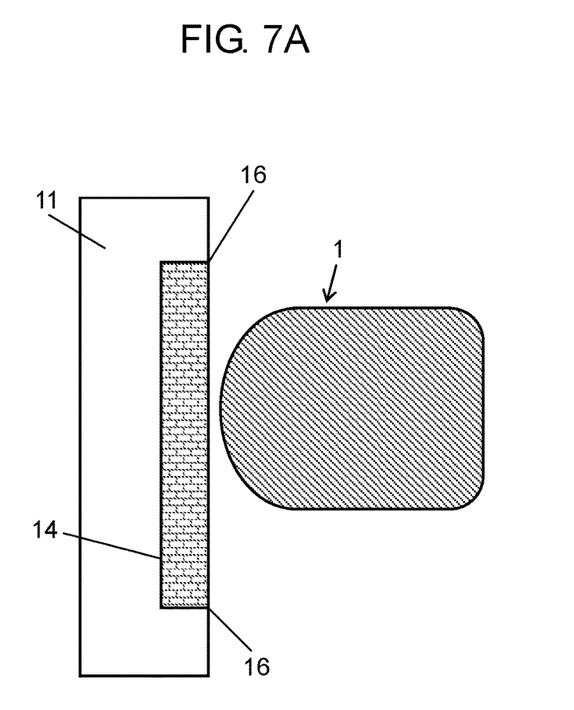
FIG. 7A is a diagram illustrating a state where the autonomous moving device according to the first exemplary embodiment of the present disclosure is stopped in front of the automatic power supply device.
Figure 7B:
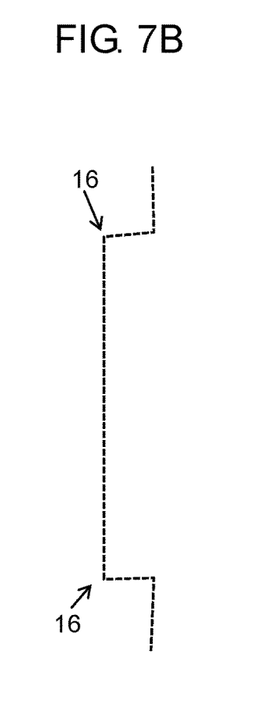
FIG. 7B is a diagram illustrating a shape of the automatic power supply device which is measured when the autonomous moving device according to the first exemplary embodiment of the present disclosure is stopped.

At this time, there is a need to carry out the correction to a direction which is included in measurement plane 3, and is perpendicular with respect to the advancing direction of autonomous moving device 1. The correction to the perpendicular direction will be described by using FIG. 7A and FIG. 7B. FIG. 7A is a diagram which is obtained by viewing a state where autonomous moving device 1 is stopped in front of automatic power supply device 11 from above autonomous moving device 1, and FIG. 7B is a diagram illustrating the shape of automatic power supply device 11 which is measured by using environment information obtaining sensor 2, when autonomous moving device 1 is stopped. As illustrated in FIG. 7A, edge 16 is provided in each of both ends of cavity unit 14 which is included in automatic power supply device 11. A width (that is, gap between edges 16 which are on both ends) of cavity unit 14 is smaller than a diameter of the obstacle detection area where environment information obtaining sensor 2 is included. By the making in this manner, as illustrated in FIG. 7B, it is possible to detect edge 16 in cavity unit 14 of automatic power supply device 11, from the data which is measured by environment information obtaining sensor 2 of autonomous moving device 1. In autonomous moving device 1, it is possible to perform not only the position correction in the advancing direction of autonomous moving device 1 but also the position correction in the direction which is perpendicular to the advancing direction, by using the shape of cavity unit 14 of automatic power supply device 11, and autonomous moving device 1 can be stopped more accurately ahead of automatic power supply device 11.

FIG. 6B illustrates a state when autonomous moving device 1 arrives ahead of automatic power supply device 11.

As illustrated in FIG. 6B, autonomous moving device 1 is stopped at the stop position, before the contact with automatic power supply device 11, and before safety stop area 4 of autonomous moving device 1 detects the housing of automatic power supply device 11.

After autonomous moving device 1 arrives at automatic power supply device 11, automatic power supply device 11 obtains the arrival information through the communication, and drives power supplier 12, as illustrated in FIG. 6C, and presses power supply terminal 13 against power receiver 5 of autonomous moving device 1. Thereafter, automatic power supply device 11 starts the power supply, thereby, the power supply to rechargeable battery 6 of the autonomous moving device 1 from automatic power supply device 11 is realized.

In a case where autonomous moving device 1 is separated from automatic power supply device 11, and starts the movement, autonomous moving device 1 starts the movement, by a flow which is contrary to the above description.

When autonomous moving device 1 starts the movement, automatic power supply device 11 obtains the movement start information through the communication, and stores power supplier 12 in the housing, after the obtaining. Thereafter, autonomous moving device 1 starts the movement, after confirming that power supplier 12 of automatic power supply device 11 is stored.

When autonomous moving device 1 starts the movement, it is desirable that from autonomous moving device 1 is moved backward as approximately 5 cm, thereafter, a normal operation is performed. This is because safety stop area 4 may detect a portion of the housing of automatic power supply device 11, if autonomous moving device 1 performs a turning operation on the spot, after automatic power supply device 11 stores power supplier 12.

Figure 8:
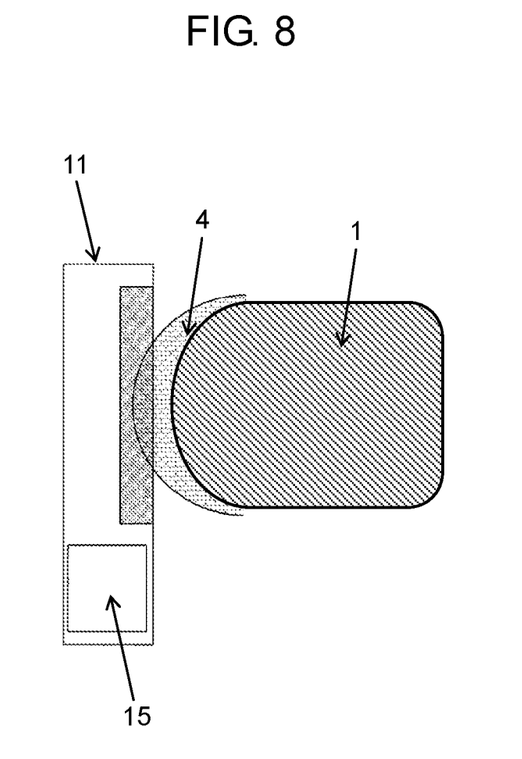
FIG. 8 is a diagram illustrating a disposition relationship between a display unit of the automatic power supply device according to the first exemplary embodiment of the present disclosure, and the autonomous moving device.

Next, display unit 15 of automatic power supply device 11 will be described, by using FIG. 8. FIG. 8 is a diagram which is obtained by viewing the disposition relationship between display unit 15 of automatic power supply device 11 and autonomous moving device 1 from above. Automatic power supply device 11 has several states such as a standby state, a charging state, or a stopping state. Display unit 15 is included, in order to notify an user of the state.

In this case, it is desirable that autonomous moving device 1 is separated from display unit 15 and is stopped so that display unit 15 is in the position which is easily viewed by the user. In FIG. 7A and FIG. 7B, autonomous moving device 1 is stopped on the right side with respect to the advancing direction of autonomous moving device 1, with respect to automatic power supply device 11. At this time, since cavity unit 14 is not necessary in the vicinity of display unit 15, as illustrated in FIG. 8, it is possible to make cavity unit 14 smaller.

In the above description, a case where autonomous moving device 1 is used as a moving body is described, but it is possible to apply the moving body to other moving bodies including environment information obtaining sensor 2, regardless of autonomous moving device 1.

A case where a laser sensor is used as environment information obtaining sensor 2 is described, but it is possible to apply various sensors.

A case where a contact power supply method is used as a power supply method of automatic power supply device 11 is described, but various charging methods can be applied, such that a non-contact charging device is used.

A case where the rechargeable battery is used as a power source of the moving body is described, but it is possible to apply various power sources as a drive source.

Second Exemplary Embodiment

In the first exemplary embodiment, it is described that the shape of cavity unit 14 is the rectangular shape, but the shape of cavity unit 14 may be various shapes. Another shape relating to cavity unit 14 will be described by using FIG. 9, as a second exemplary embodiment.

Figure 9:
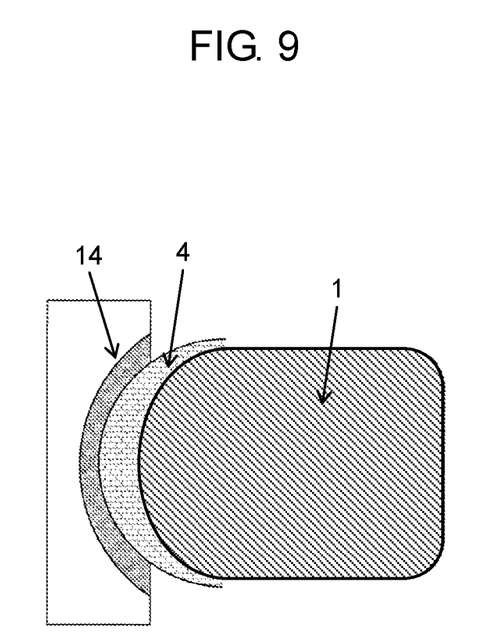
FIG. 9 is a diagram illustrating a disposition between an autonomous moving device and an automatic power supply device at the time of a power supply, with respect to an automatic power supply system according to a second exemplary embodiment of the present disclosure.

In the second exemplary embodiment, FIG. 9 is a diagram which is obtaining by viewing the disposition of autonomous moving device 1 and automatic power supply device 11 at the time of the power supply of autonomous moving device 1 from above. In FIG. 9, as a shape of cavity unit 14, a fan shape is substantially adopted.

In a case where safety stop area 4 which is provided in the front-sided vicinity of autonomous moving device 1 has a fan shape, by making the shape of cavity unit 14 on the side of automatic power supply device 11 the same shape, it is possible to prevent that cavity unit 14 becomes too much large even in a case where safety stop area 4 of autonomous moving device 1 is set more largely.

Third Exemplary Embodiment

Next, in a case where a plurality of automatic power supply devices 11 are disposed side by side, a technology of improving a stop function of autonomous moving device 1 ahead of automatic power supply device 11, will be described.

In the first exemplary embodiment and the second exemplary embodiment, it is described that autonomous moving device 1 has a technology of correcting the own position of autonomous moving device 1 by using the shape of automatic power supply device 11. However, by using the technology, in a case where autonomous moving device 1 is moved towards one specific automatic power supply device 11 from the plurality of automatic power supply devices 11, and in a case where automatic power supply devices 11 are set side by side, in autonomous moving device 1, since automatic power supply device 11 having a similar shape is present, there is possibility that the own position correction of autonomous moving device 1 is carried out by using erroneous automatic power supply device 11, and as a result, the erroneous own position correction thereof is carried out, and autonomous moving device 1 arrives ahead of erroneous automatic power supply device 11.

Each of the plurality of automatic power supply devices 11 has cavity units 14 of which shapes are different from each other, thereby, it is possible to solve the problems described above.

Figure 10:
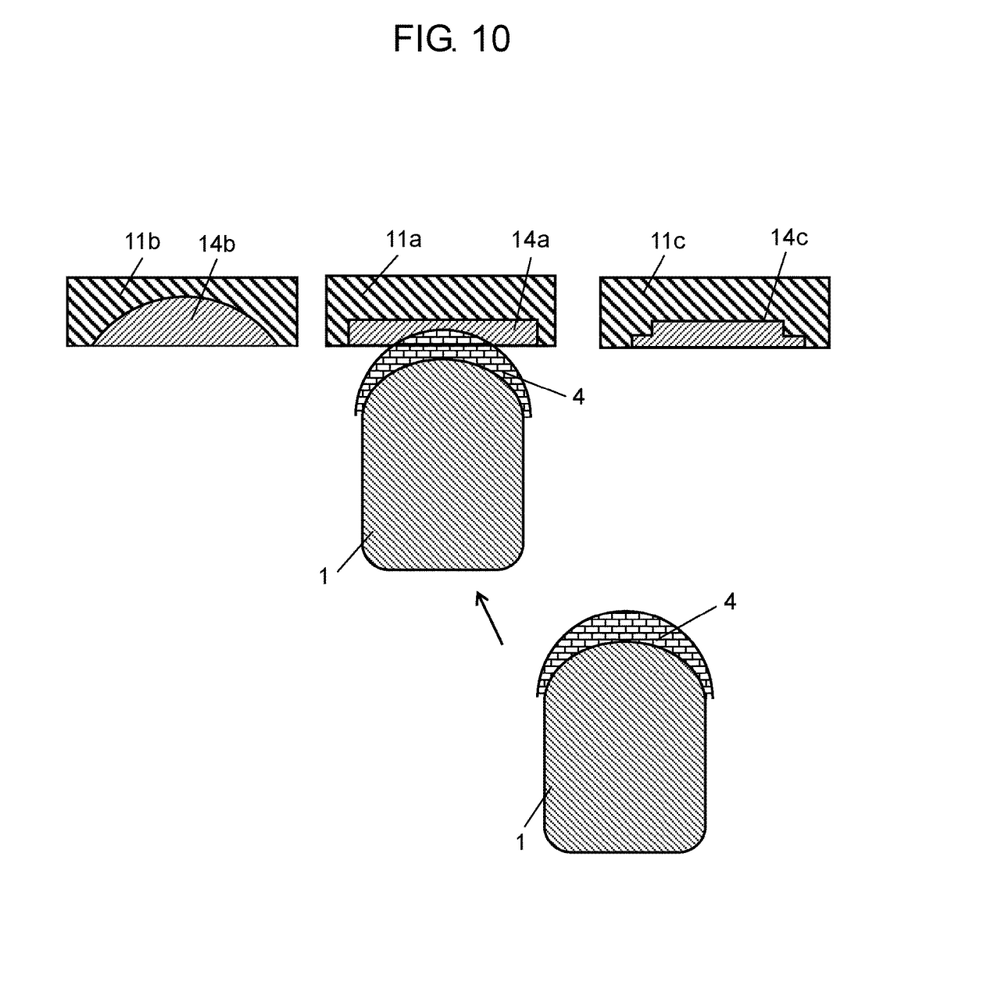
FIG. 10 is a diagram illustrating a disposition relationship between an automatic power supply device and an autonomous moving device, in an automatic power supply system according to a third exemplary embodiment of the present disclosure.

In the automatic power supply system according to the third embodiment, as illustrated in FIG. 10, three automatic power supply devices 11a, 11b, and 11c are disposed side by side, and FIG. 10 is a diagram illustrating a case where autonomous moving device 1 causes a specific device to approach by selecting the specific device among automatic power supply devices 11a to 11c, and is a diagram which is obtained by viewing automatic power supply devices 11a to 11c from above. In FIG. 10, the autonomous moving system of autonomous moving device 1 is also illustrated.

Automatic power supply device 11a includes cavity unit 14a having a rectangular shape. Automatic power supply device 11b includes cavity unit 14b having a fan shape. Automatic power supply device 11c includes cavity unit 14c having a stepped shape that is obtained by combining rectangular shapes of which sizes are different from each other.

It is assumed that autonomous moving device 1 receives the power supply from only automatic power supply device 11a.

Autonomous moving device 1 confirms the shapes of cavity units 14a to 14c in each of automatic power supply devices 11a to 11c, by using environment information obtaining sensor 2. Autonomous moving device 1 selects specific cavity unit 14a, and approaches automatic power supply device 11a.

In this manner, autonomous moving device 1 may approach by selecting predetermined automatic power supply device 11a.

As a shape of the cavity, it is possible to use various shapes such as the rectangular shape, the fan shape, or the stepped shape that is obtained by combining the rectangular shapes of which sizes are different from each other described above.

Other Examples

Figure 11A:
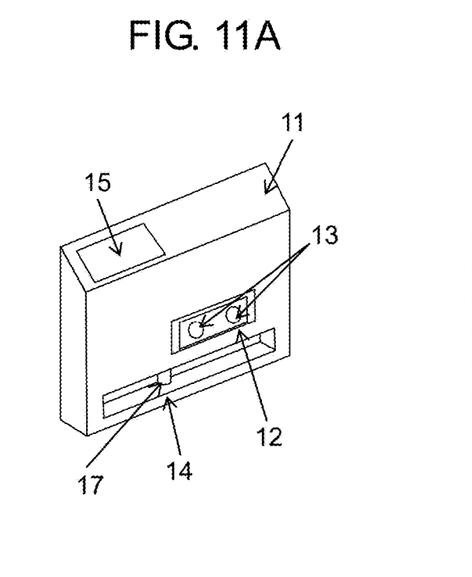
FIG. 11A is a diagram illustrating a modification example of the automatic power supply device according to the third exemplary embodiment of the present disclosure.
Figure 11B:
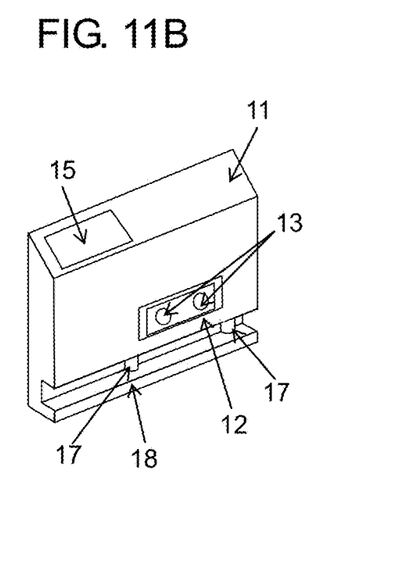
FIG. 11B is a diagram illustrating a modification example of the automatic power supply device according to the third exemplary embodiment of the present disclosure.

Regarding automatic power supply device 11, as a modification example, in cavity unit 14, a portion of edge 16 may be replaced with protrusion 17, as illustrated in FIG. 11A. As illustrated in FIG. 11B, groove unit 18 may be used in place of cavity unit 14, and protrusion 17 may be provided at a position corresponding to edge 16.

INDUSTRIAL APPLICABILITY

The autonomous power supply device according to the present invention facilitates the automatic power supply to the moving body which has a limitation on the approach to the object, such as the autonomous moving device having the safety stop area in the measurement area of the environment information obtaining sensor.

REFERENCE MARKS IN THE DRAWINGS 1 autonomous moving device
2 environment information obtaining sensor
3 measurement plane
4 safety stop area
5 power receiver
6 rechargeable battery
7 moving means
R running surface
11, 11a, 11b, 11c automatic power supply device
12 power supplier
13 power supply terminal
14, 14a, 14b, 14c cavity unit
15 display unit
16 edge
17 protrusion
18 groove unit

The invention claimed is:

1. An autonomous moving system comprising:
an autonomous moving device including
an environment information obtaining sensor that obtains peripheral environment information, and
a controller that causes movement to a spot having a predetermined distance from a current spot, based on the environment information; and
an automatic power supply device including
a housing that includes a cavity unit or a groove unit in a portion of the housing,
wherein a safety stop area is set in a portion of the environment information obtaining sensor, and
a depth of the cavity unit is larger than a distance obtained by subtracting a distance between a tip of the autonomous moving device and the automatic power supply device, when the autonomous moving device arrives at the automatic power supply device, from a distance which is from the tip of the autonomous moving device to a tip of the safety stop area.

2. The autonomous moving system of claim 1, wherein a protrusion is included in a portion of the cavity unit.

3. The autonomous moving system of claim 1, wherein a shape of the cavity unit is a rectangular shape.

4. The autonomous moving system of claim 1, wherein a shape of the cavity unit is a fan shape.

5. The autonomous moving system of claim 1, wherein a plurality of the automatic power supply devices are disposed, and
the plurality of automatic power supply devices have a plurality of the cavity units having shapes different from each other.

* * * * *